(12) United States Patent
Kitaoka (10) Patent No.: US 6,400,659 B1
(45) Date of Patent: Jun. 4, 2002

(54) DISK MANUFACTURING APPARATUS (75) Inventor: Yasuhide Kitaoka, Tokorozawa (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/519,183

(22) Filed: Mar. 6, 2000

(30) Foreign Application Priority Data

Mar. 8, 1999 (JP) .......................................... 11-060272

(51) Int. Cl.[7] .............................................. G11B 17/22
(52) U.S. Cl. ...................................................... 369/34
(58) Field of Search .......................... 369/30–34, 35–37

(56) References Cited

U.S. PATENT DOCUMENTS

| | | | |
|---|---|---|---|
| 5,232,505 A | 8/1993 | Novak et al. ............... 118/712 |
| 5,542,768 A | 8/1996 | Rother et al. | |
| 5,546,315 A * | 8/1996 | Kleinschnitz .............. 369/34 X |
| 5,734,629 A | 3/1998 | Lee et al. ...................... 369/34 |
| 5,946,216 A * | 8/1999 | Hollerich ............... 364/478.11 |
| 6,081,785 A * | 6/2000 | Oshima et al. ................ 705/1 |
| 6,222,800 B1 * | 4/2001 | Miller ....................... 369/84 X |

* cited by examiner

*Primary Examiner*—James R. Bidwell
(74) *Attorney, Agent, or Firm*—Anderson Kill & Olick; Eugene Lieberstein; Michael N. Meller

(57) ABSTRACT

A disk manufacturing apparatus has a recorder recording information on a blank disk-like recording medium placed on an extended recording tray provided on the recorder, in a state in which the recording tray is retracted into the recorder; a printer printing a label affixed to a recorded disk placed on an extended printer tray provided on the printer, in a state in which the printer tray is retracted into the printer; and a transporter transporting the disk, a zone of movement of the disk transported to and from the recorder and a zone of movement of the disk transported to and from the printer being separated from each other.

4 Claims, 4 Drawing Sheets

DISK MANUFACTURING APPARATUS

BACKGROUND OF THE INVENTION

1. Field of the Invention

The present invention relates generally to a disk manufacturing apparatus, and more particularly, to a disk manufacturing apparatus that automatically records information on a blank CD-ROM disk and prints a label affixed to the disk.

2. Description of the Related Art

Generally, a simplified disk manufacturing apparatus for recording information on a blank disk such as a CD-ROM, hereinafter referred to as a compact disk, is known. What is herein referred to as a simplified compact disk manufacturing apparatus is an apparatus which, while lacking the mass-production capabilities of industrial compact disk manufacturing apparatuses, nevertheless is capable of producing a certain number of compact disks at a time.

Figure 1:
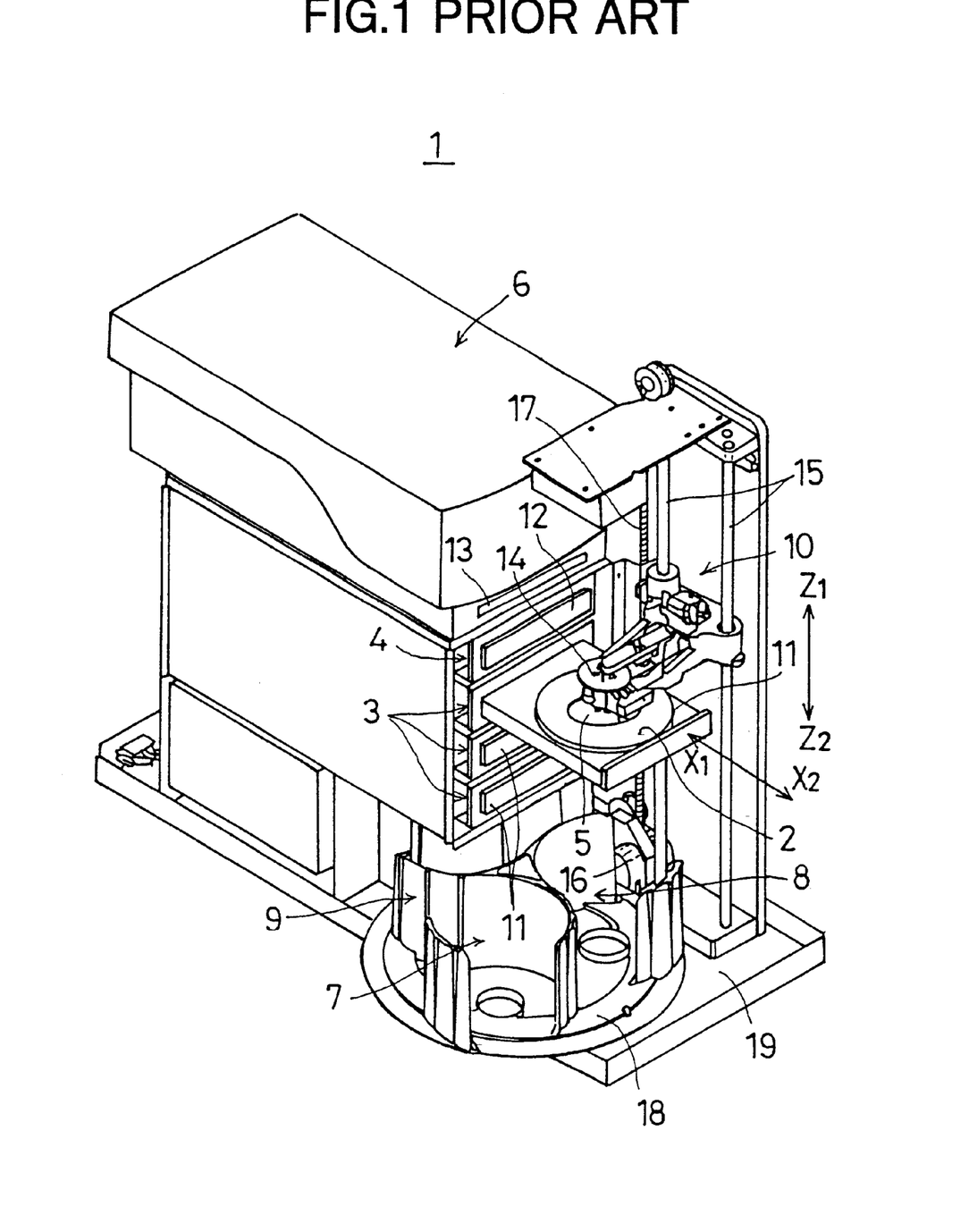
FIG. 1 shows a conventional compact disk manufacturing apparatus.

FIG. 1 shows such a conventional compact disk manufacturing apparatus 1. The compact disk manufacturing apparatus 1 shown in the drawing is disclosed in U.S. Pat. No. 5,734,629.

Generally, the compact disk manufacturing apparatus 1 shown in FIG. 1 includes at least one or more CD-ROM recorders 3 for recording information on blank compact disks 2. The apparatus 1 shown in FIG. 1, for example, has three such recorders 3.

In addition, the compact disk manufacturing apparatus 1 shown in FIG. 1 has an inspection device 4 to verify that information has been properly recorded to the compact disk 2, a printer 6 for printing a label 5 affixed to a back surface of the compact disk 2, that is, the surface opposite the recording surface of the compact disk 2, a variety of stockers 7, 8, 9 for holding the compact disks 2 and a transporter 10 for transporting the compact disks 2 between the devices 3, 4, 5, 6, 7, 8, 9 described above.

Typically, the CD-ROM recorder 3 and the inspection device 4 are the same unit. Hereinafter, however, for convenience of description the unit that records the information to the compact disk 2 using a recording function is referred to as the CD-ROM recorder 3 and the unit that inspects the compact disk 2 using a reproducing function to verify that a predetermined recording has in fact been properly performed is referred to as an inspection device 4. In addition, in the following description a blank compact disk 2 on which information has been recorded is referred to as a recorded compact disk 2.

The CD-ROM recorder 3 described above is provided with a recorder tray 11. A blank compact disk 2 is placed on the recorder tray 11, which is extended in a direction indicated by arrow X2 as shown in FIG. 1. Information is recorded on the blank compact disk 2 in a state in which the recorder tray 11, on which a blank compact disk 2 is loaded, is retracted into the compact disk manufacturing apparatus 1, in a direction indicated by arrow X1.

Similarly, the inspection device 4 is provided with an inspection tray 12. A recorded compact disk 2 is placed on the inspection tray 12, which is extended in the direction of arrow X2. The recorded compact disk 2 is inspected in a state in which the inspection tray 12, on which a recorded compact disk 2 is loaded, is retracted into the compact disk manufacturing apparatus 1, in the direction of arrow X1.

The CD-ROM recorder 3 and inspection device 4 have conventionally been arranged vertically one atop the other as shown in FIG. 1, with the inspection device 4 positioned at the uppermost part of a plurality of CD-ROM recorders 3.

As noted previously, the printer 6 prints a label 5 previously affixed to the back surface of the compact disk 2. The printer 6 is provided with a printer tray 13 on which recorded compact disks 2 are placed. A recorded compact disk 2 that has been inspected by the inspection device 4 and found to be properly recorded is placed on the printer tray 13 which is extended in the direction of arrow X2. The printer tray 13 then retracts into the compact disk manufacturing apparatus 1 in the direction of arrow X1 and the printer begins printing to the label 5.

It will be appreciated that in an ordinary printer for printing on sheets of paper the printer head, which may be for example an ink jet head, moves in a straight line while feeding the paper to the head. By contrast, instead of feeding paper to the head, the printer 6 for printing the label 5 affixed to the back side of the recorded compact disk 2 typically operates by gradually moving the printer tray 13 on which the recorded compact disk 2 is placed in the direction of arrow X2, thereby printing the entire label 5.

The printer 6 is positioned at an uppermost part of the compact disk manufacturing apparatus 1. Placement of the printer 6 at the top of the compact disk manufacturing apparatus 1 is dictated by the need to make servicing the printer 6 convenient.

In addition, a carousel 18 is provided atop a base 19 positioned at the bottommost portion of the compact disk manufacturing apparatus 1. A stocker 7 for blank disks, a stocker 8 for properly recorded disks and a stocker 9 for defectively recorded disks are provided on the carousel 18.

The stocker 7 for blank compact disks 2 holds those compact disks 2 which have not yet been recorded. The stocker 8 for properly recorded compact disks 2 holds compact disks 2 that have been inspected by the inspection device 4 and found to be properly recorded and for which the labels 5 affixed to the back surfaces of the compact disk 2 have been printed by the printer 6. The stocker 9 for defectively recorded compact disks 2 holds those compact disks 2 that have been inspected by the inspection device 4 and found to be defectively recorded. The defectively recorded compact disks 2 do not undergo printing.

It should be noted that the stockers 7, 8, 9 are configured so as to be positionable directly beneath the trays 11, 12, 13 by the rotation of the carousel 18.

The transporter 10 comprises a carriage 14, a rail 15, a motor 16, a belt 17 and so on. The carriage 14 detachably supports a compact disk 2. The carriage 14 is guided by the rail 15 and is movable in a vertical direction indicated by double-headed arrow Z1–Z2 in FIG. 1. In addition, the belt 17, which is driven by the motor 16, is connected to the carriage 14, in such a way that when the motor 16 rotates the carriage 14 moves up or down, as the case may be. Thus can the transporter 10 transport the compact disks 2 among the various devices 3–9 described above.

In the compact disk manufacturing apparatus 1 described above, the carriage 14 performs five different functions or steps, which may be briefly described as follows in the sequence in which they are performed:

1. transporting the blank compact disks 2 stored in the stocker 7 to the CD-ROM recorder 3 transport tray 11;
2. transporting the recorded compact disks 2 recorded by the CD-ROM recorder 3 from the CD-ROM recorder 3 transport tray 11 to the inspection tray 12;
3. transporting those compact disks 2 inspected by the inspection device 4 and found to be defectively recorded to the stocker 9 for defectively recorded compact disks 2;

4. transporting those compact disks 2 inspected by the inspection device 4 and found to be properly recorded from the inspection device 4 inspection tray 12 to the printer 6 printer tray 13; and 5. transporting recorded compact disks 2 for which the printer 6 has printed labels 5 from the printer 6 printer tray 13 to the stocker 8 for properly recorded compact disks 2.

The conventional compact disk manufacturing apparatus 1 described above arranges the CD-ROM recorder 3, inspection device 4, printer 6 and stockers 7–9 one atop the other, so the carriage 14 moves through the same space when performing the five steps described above. At the same time, the printer tray 13 of the printer 6, on which recorded compact disks 2 are loaded for printing, moves gradually in the X2 direction.

As a result, when the printer tray 13 moves in the X2 direction as the printer 6 prints, the printer tray 13 intrudes into the above-described zone of movement of the carriage 14, thus restricting the movement of the carriage 14. More specifically, when the carriage 14 is at a position lower than that of the printer 6, the movement of the printer tray 13 in the X2 direction limits the zone of movement of the carriage to a height beneath which the carriage 14 is free to move without colliding with the printer tray 13. In addition, when the carriage 14 is positioned at a height above that of the printer tray 13 in a standby mode and the printer tray 13 is extended in the X2 position, the carriage 14 is unable to retrieve the compact disk 2 even after the compact disk 2 has been recorded by the CD-ROM recorder 3 and inspected by the inspection device 4.

As a result, a conventional compact disk manufacturing apparatus 1 having the structure described above suffers from the disadvantage that the process of manufacturing recorded compact disks 2 is slowed due to the intrusion of the extended printer tray 13 into the zone of movement of the carriage 14.

In addition, because the conventional compact disk manufacturing apparatus 1 stacks the CD-ROM recorder 3, inspection device 4 and printer 6 vertically one atop the other as noted previously, the only way to accommodate additional device units to improve efficiency is by stacking these additional units atop those units already in place. This stacking of device units one atop the other can make the apparatus 1 top-heavy and, in the worst case, may cause the apparatus 1 to tip over. A mechanism to prevent the apparatus from tipping over then becomes necessary, which in turn has the added disadvantage of increasing the size of the apparatus 1.

Further, in the conventional compact disk manufacturing apparatus 1 the individual devices 3–10 described above are exposed, so dust, dirt and so forth can accumulate inside the devices 3–10, causing the apparatus 1 to malfunction.

SUMMARY OF THE INVENTION

Accordingly, it is an object of the present invention to provide an improved and useful disk manufacturing apparatus in which the above-mentioned disadvantages are eliminated.

Another and more specific object of the present invention is to provide an improved and useful disk manufacturing apparatus capable of manufacturing compact disks both efficiently and stably.

The above-described objects of the present invention are achieved by a disk manufacturing apparatus comprising:

a recorder recording information on a blank disk-like recording medium placed on an extended recording tray, provided on the recorder, in a state in which the recording tray is retracted into the recorder;

a printer printing a label affixed to a prerecorded disk placed on an extended printer tray provided on the printer, in a state in which the printer tray is retracted into the printer; and a transporter transporting the disk, a zone of movement of the disk transported to and from the recorder and a zone of movement of the disk transported to and from the printer being separated from each other.

Additionally, the above-described objects of the present invention are also achieved by a disk manufacturing apparatus comprising:

a recorder recording information on a blank disk-like recording medium placed on an extended recording tray provided on the recorder, in a state in which the recording tray is retracted into the recorder;

a printer printing a label affixed to a prerecorded disk placed on an extended printer tray provided on the printer, in a state in which the printer tray is retracted into the printer;

a plurality of stockers separately holding blank disks, properly recorded disks and defectively recorded disks, respectively; and a transporter transporting the disks among the recorder, printer and each of the plurality of stockers, a zone of movement of the recorder as it transports a blank disk from a stocker to the recorder tray and a zone of movement of the printer tray as it extends and retracts being separated from each other.

According to the invention described above, the zone of movement of the transporter that moves the blank compact disks from the stocker to the recorder tray and the zone of movement of the printer tray provided on the printer as the printer tray is extended from the apparatus and retracted into the apparatus are spatially separated, so the compact disks can be freely transported between the CD-ROM recorder and the stockers using the transporter. In other words, the operation of the transporter is not affected by the extension of the printer tray from the printer, so the compact disks can be transported freely between the CD-ROM recorder and the stockers using the transporter, without the need to wait for the printer tray to withdraw from the zone of movement of the transporter. As a result, waiting time is eliminated and compact disk manufacturing efficiency improved.

Additionally, the above-described objects of the present invention are also achieved by the disk manufacturing apparatus as described above, wherein the stocker for holding defectively recorded disks is positioned directly beneath the recorder tray in a state in which the recorder tray is extended from the recorder.

According to the invention described above, positioning the stocker holding defectively recorded disks directly beneath the recorder tray when the recorder tray is extended from the CD-ROM recorder so that the recorder tray need only lower the defectively recorded disks, hereinafter referred to as defective disks, onto the defectively recorded disk stocker reduces the amount of time required to transport the defective disks from the CD-ROM recorder to the defective disk stocker, thus improving the efficiency of compact disk manufacture.

Additionally, the above-described objects of the present invention are also achieved by the disk manufacturing apparatus as described above, wherein the stocker for holding the properly recorded disks is positioned directly beneath the printer tray in a state in which the printer tray is extended from the printer.

According to the invention described above, properly recorded disks, hereinafter referred to as recorded disks, are transported to the printer and the labels printed. When the printing process is completed the printer tray is extended from the printer and the recorded disk is transported by the transporter device to the recorded disk stocker.

In such a state, the recorded disk stocker is positioned directly beneath the extended printer tray, so transport of the recorded disk to the recorded disk stocker can be accomplished simply by lowering the recorded disk into the recorded disk stocker, thus reducing the amount of time required to transport the recorded disk from the printer to the recorded disk stocker and thereby improving the efficiency of compact disk manufacture.

Additionally, the above-described objects of the present invention are also achieved by the disk manufacturing apparatus as described above, wherein the recorder, printer plurality of stockers and transporter are enclosed in a dustproof dustproof housing.

According to the invention described above, by enclosing the recorder, printer, stockers and transporter inside a dustproof housing the intrusion of dust and dirt can be prevent and proper operation of the individual devices can be maintained.

Other objects, features and advantages of the present invention will become more apparent from the following detailed description when read in conjunction with the accompanying drawings.

DESCRIPTION OF THE PREFERRED EMBODIMENTS

A detailed description will now be given of a first embodiment of a disk manufacturing apparatus according to the present invention, with reference to the accompanying drawings.

Figure 2:
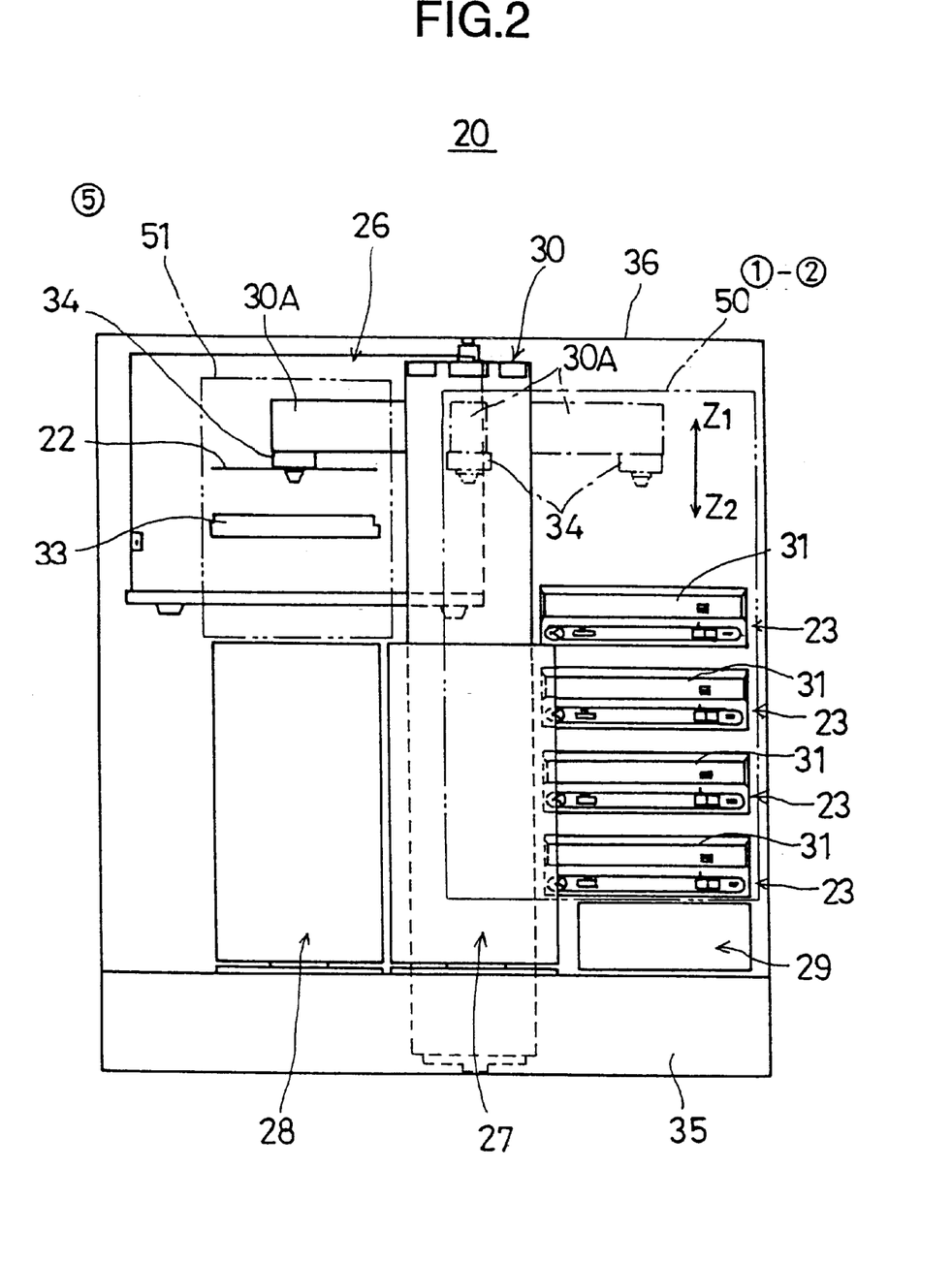
FIG. 2 is a frontal view of an interior structure of a disk manufacturing apparatus according to an embodiment of the present invention.
Figure 3:
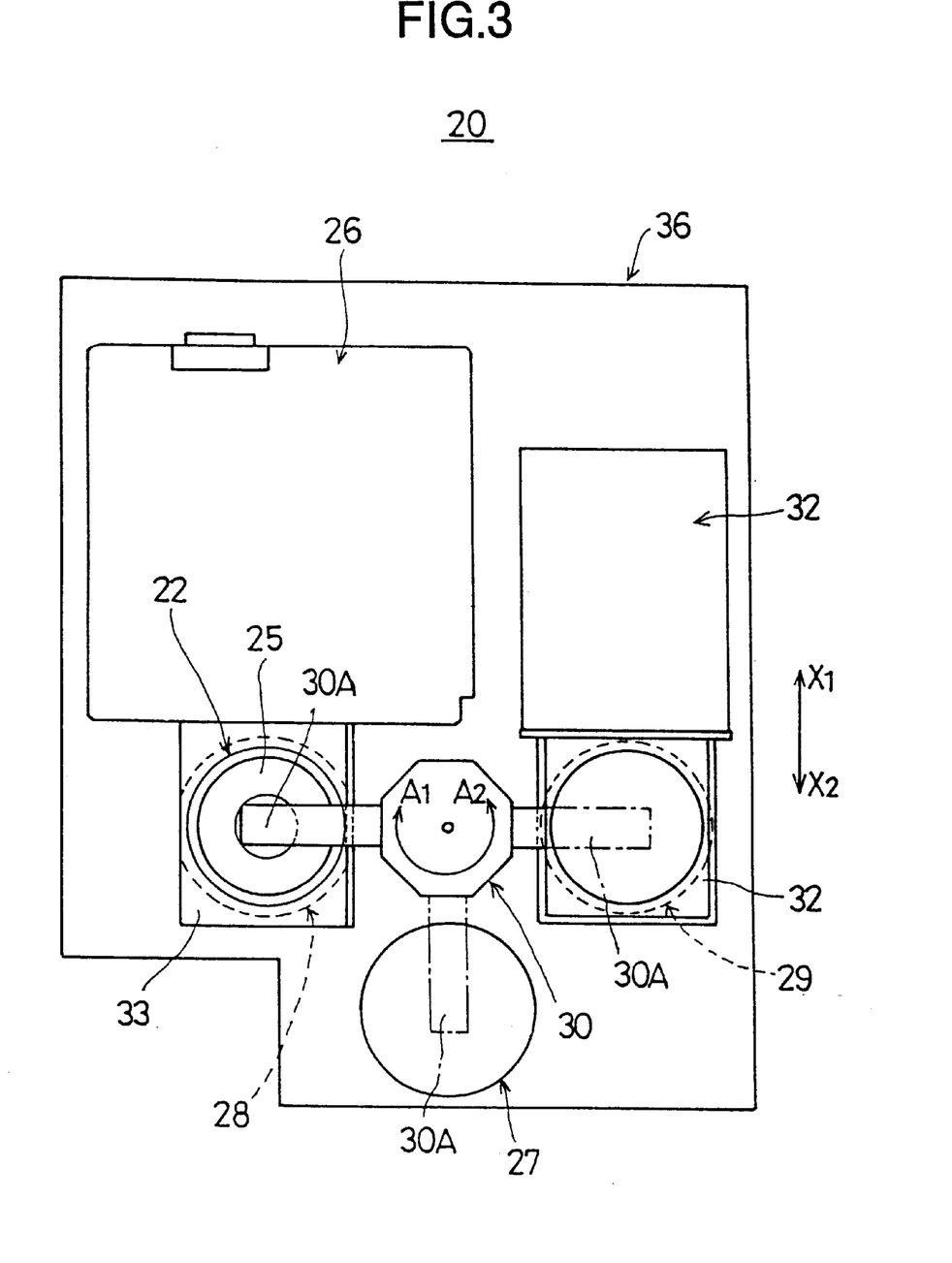
FIG. 3 is a plan view of an interior structure of a disk manufacturing apparatus according to an embodiment of the present invention.
Figure 4:
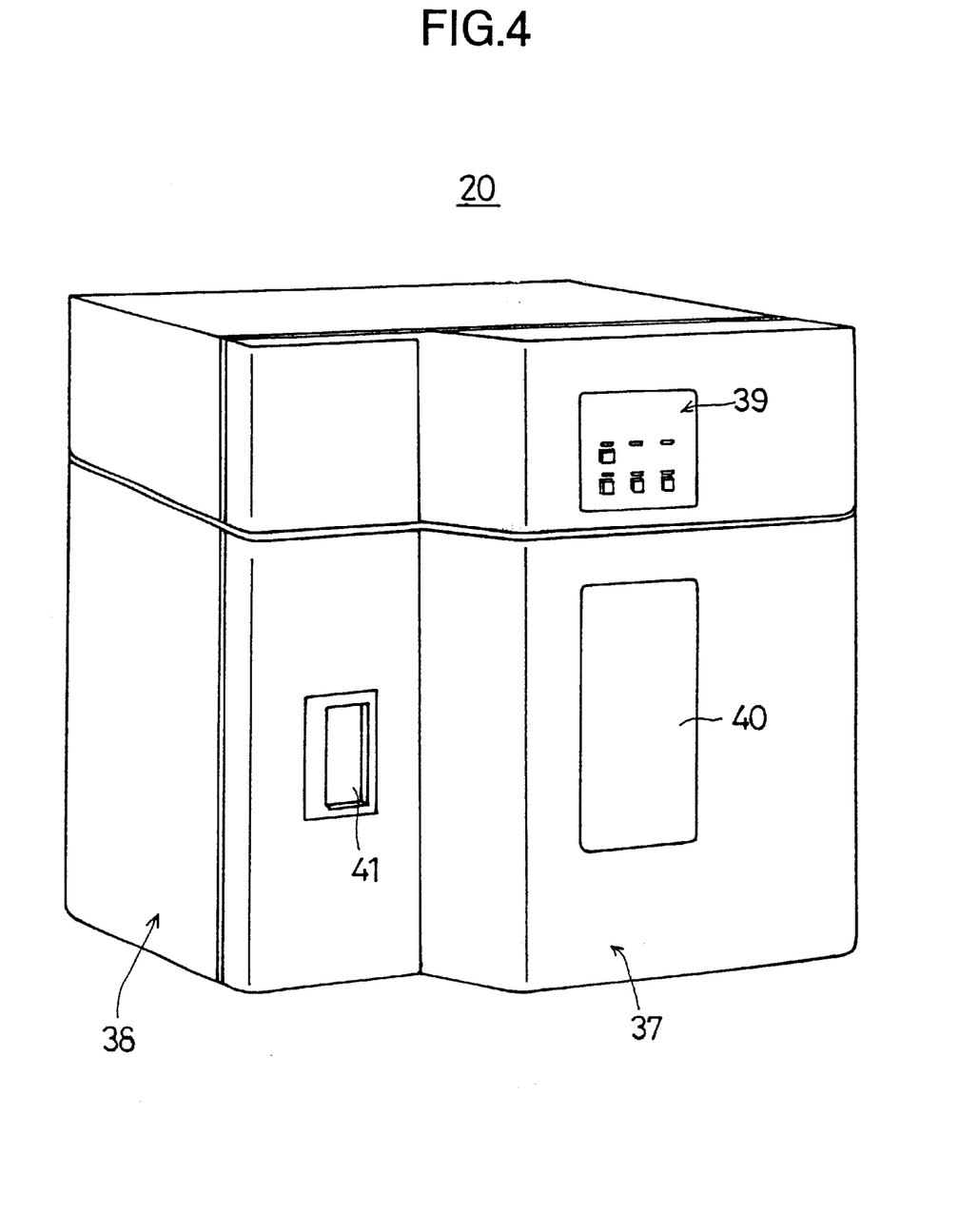
FIG. 4 is an exterior view of a disk manufacturing apparatus according to an embodiment of the present invention.

FIGS. 2, 3 and 4 show a disk manufacturing apparatus 20 according to an embodiment of the present invention. FIG. 2 is a frontal view of an interior of the disk manufacturing apparatus 20 according to one embodiment of the present invention. FIG. 3 is a plan view of the interior of the disk manufacturing apparatus 20 according to one embodiment of the present invention. FIG. 4 is an exterior view of the disk manufacturing apparatus 20 according to one embodiment of the present invention.

In general outline, the disk manufacturing apparatus 20 has a plurality of recorders 23 for recording information on blank compact disks 22, such recorders hereinafter being referred to as CD-ROM recorders 23; a printer 26 for printing to a label 25 affixed to a back side of the blank compact disks 22; a variety of stockers 27–29 for holding the compact disks 22; a transporter 30 for transporting the compact disks 22 between the various devices 23–29 described above; and a dustproof housing 36 enclosing the compact disk manufacturing apparatus 20 so as to prevent dust and dirt from accumulating therein.

The CD-ROM recorder 23 both records information to and reproduces information from the compact disk 22. Accordingly, the CD-ROM recorder 23 not only records information to the compact disk 22 but is also capable of reproducing the information recorded thereto in order to verify that a predetermined recording has been properly performed.

In short, the disk manufacturing apparatus 20 according to the present embodiment does not have the conventional dedicated inspection device. Instead, each of the CD-ROM recorders 23 functions as an inspection device.

In addition, a recorder tray 31 is provided at each CD-ROM recorder 23. A blank compact disk 22 is placed on the recorder tray 31, which is extended in a direction represented by arrow X2 in FIG. 3, the recorder tray 31 is retracted into the apparatus 20 in a direction represented by arrow X1 in FIG. 3 and the CD-ROM recorder 23 records information on the compact disk 22.

In the present embodiment, a plurality of CD-ROM recorders 23 are stacked vertically one atop another and positioned to a right side of an interior of the dustproof housing 36 that encloses the compact disk manufacturing apparatus 20. For convenience, a description of the dustproof housing 36 will be deferred until later.

The printer 26, as mentioned previously, prints a label affixed to a back surface of the compact disk 22, that is, a surface opposite the surface on which information is recorded by the CD-ROM recorder 23. The printer 26 is provided with a printer tray 33. Compact disks 22 that have been verified and found to have been properly recorded are placed on the printer tray 33 in a state in which the printer tray 33 is extended in the direction of arrow X2. The printer tray is then retracted into the apparatus 20 in the direction of arrow X1 and the printer begins printing on the label 25 affixed to the back surface of the compact disk 22.

The printer 26 employed in the present embodiment, like the printer 6 mounted on the conventional compact disk manufacturing apparatus 1 described above, is configured so as to print the entire label 25 by gradually moving the printer tray 33 in the X2 direction. The printer 26 is positioned at a top portion of the disk manufacturing apparatus 20 for ease of maintenance, and further is positioned at a left side of the interior of the dustproof housing 36 that encloses the apparatus 20.

In addition, a blank disk stocker 27 for unrecorded compact disks, a recorded disk stocker 28 for properly recorded disks 28 and a defective disk stocker 29 for defectively recorded disks are provided on top of a base 35 positioned at a bottommost portion of the disk manufacturing apparatus 20.

As might be expected, the blank disk stocker 27 holds compacts disks 22 on which information has not yet been recorded. The recorded disk stocker 28 holds compact disks 22 that have been inspected by the CD-ROM recorder 23 and found to be properly recorded and for which the labels 25 affixed to the back surfaces of the compact disk 22 have been printed by the printer 26. The stocker 29 for defectively recorded compact disks 22 holds those compact disks 22 that have been inspected by the CD-ROM recorder 23 and found to be defectively recorded. The defectively recorded compact disks 22 do not undergo printing. It should be noted that the blank disk stocker 27 is provided with an arm travel slot not shown in the diagram so as to permit an arm 30A to travel all the way to a bottom of the blank disk stocker 27 stocker.

In the present invention, as shown in FIG. 3 each of the above-described stockers 27, 28, 29 are positioned so as to be positionable directly beneath the recorder tray 31 in a state in which the recorder tray 31 is extended from the CD-ROM recorder 23, with the recorded disk stocker 28 positioned directly beneath the printer tray 33 in a state in which the printer tray 33 is extended from the printer 26.

The transporter 30 comprises the arm 30A mentioned above, that is, a carriage; a clamper 34; and a main unit 42. As shown in FIG. 3, the transporter 30 is positioned intermediate between a position at which the printer 26 is disposed and a position at which the CD-ROM recorders 23 are stacked vertically one atop another, at a point forward of both the printer 26 and the stacked CD-ROM recorders 23.

The arm 30A extends sideways from the main unit 42, and is rotatably driven by a drive unit not shown in the diagram so as to rotate about the main unit 42 in directions represented by semi-circular double-headed arrow A1-A2, and at the same time is movable in a vertical direction represented by double-headed arrow Z1-Z2. The clamper 34 is provided on a tip portion of the arm 30A and serves to load compact disks 22 to and remove compact disks 22 from the arm 30A. In this manner the transporter 30 is able to transport compact disks 22 between individual devices 33–39 described above.

As shown in FIG. 4, the dustproof housing 36 is constructed so as to cover and enclose the CD-ROM recorder 23, the printer 26, the stockers 27, 28, 29 and the transporter 30. The dustproof housing 36 comprises a door 37 and a main body 38. The door 37 is opened by manipulating a handle 41 so as to open the door 37 and reveal the enclosed interior.

The individual stockers 27, 28, 29 are loaded and/or emptied and the printer 26 serviced in a state in which the door 37 is open. In a state in which the door 37 is closed no dust or dirt can enter the interior of the dustproof housing between the door 37 and the main body 38.

Accordingly, it is possible to prevent dust and dirt from getting into the individual devices 23, 26–30 and so it is possible to maintain the devices 23, 26–30 in good operating condition.

In addition, it should be noted that a control panel 39 containing various controls for the operation of the disk manufacturing apparatus 20 is provided on the door 37, as is a window 40 for observing the interior of the dustproof housing.

Next, a description will be given of an operation of the disk manufacturing apparatus 20 having the structure described above.

When the control panel is operated to begin operation of the disk manufacturing apparatus 20, first the transporter 30 moves the arm 30A to the blank disk stocker 27 and grasps a blank compact disk 22 with the clamper 34.

Next, the transporter 30 transports the compact disk 22 to a designated one of the four CD-ROM recorders 23 shown in the present embodiment. At this time the recorder tray 31 of the CD-ROM recorder 23 is extended in the X2 direction before the compact disk 22 is transported. The transporter 30 then places the transported compact disk 22 on the recorder tray 31.

When the compact disk 22 is placed on the recorder tray 31, the CD-ROM recorder 23 retracts the recorder tray 31 inward in the X1 direction and records information on the compact disk 22. When recording is completed the CD-ROM recorder 23 then reproduces the information so recorded in order to verify that the information has been properly recorded. When verification is completed the recorder tray 31 is once again extended in the X2 direction.

When the CD-ROM recorder 23 has completed recording information on the compact disk 22, the transporter 30 removes the recorded compact disk 22 from the recorder tray 31. Compact disks 22 found to have been defectively recorded are transported to the defective disk stocker 29 by the transporter 30.

It may be recalled that, as described above, the defective disk stocker 29 is positioned directly beneath the recorder tray 31 in a state in which the recorder tray 31 is extended in the X2 direction from the CD-ROM recorder 23. As a result, when the transporter 31 transports the defective disk 22 to the defective disk stocker 29 the transporter is able to effect the transfer of the defective disk 22 to the defective disk stocker 29 simply by lowering the defective disk 22 into the defective disk stocker 29. Accordingly, the time required to transport the defective disk 22 from the CD-ROM recorder 23 to the defective disk stocker 29 can be reduced and thus compact disk manufacturing efficiency can be improved.

By contrast, compact disks 22 inspected and found to be properly recorded are transported by the transporter 30 to the printer tray 33 of the printer 26. The transporter 30 rotates the arm 30A in the direction represented by arrow A1 in FIG. 3 and transports the recorded compact disk 22 to the printer tray 33. It should be noted that the printer tray 33 is extended in the X2 direction before the recorded compact disk 22 is transported thereto.

When the recorded compact disk 22 is placed on the printer tray 33, the printer 26 retracts the printer tray 33 inward in the X1 direction and the printer 26 begins to print the label 25. As noted previously, the printer 26 prints the entire label 25 by gradually moving the printer tray 33 in the X2 direction. The printer tray 33 is in a state of complete extension in the X2 direction when printing is completed.

When the printing process described above is completed, the transporter 30 removes the recorded compact disk 22 from the printer tray 33 and the printer 26 retracts the printer tray 33 in the X1 direction. If an error occurs during the printing process, the transporter 30 transports the recorded compact disk 22 to the defective disk stocker 29. Such print errors are extremely rare, however, so the number of times the transporter 30 transports a recorded compact disk 22 to the defective disk stocker 29 is extremely limited.

When the printing process described above is successfully completed, the transporter 30 transports the recorded compact disk 22 to the recorded disk stocker 28.

It may be recalled that, as described above, the recorded disk stocker 28 is positioned directly beneath the printer tray 33 in a state in which the printer tray 33 is extended in the X2 direction from the printer 26. As a result, the transporter 30 is able to effect the transfer of the recorded compact disk 22 to the recorded disk stocker 28 simply by lowering the recorded compact disk 22 into the recorded disk stocker 28. Accordingly, the time required to transport the recorded compact disk 22 from the printer 26 to the recorded disk stocker 28 can be reduced and thus compact disk manufacturing efficiency can be improved.

In the disk manufacturing apparatus 20 described above, the arm 30A performs five different functions or steps, which may be briefly described as follows in the sequence in which they are performed:

1. transporting the blank compact disks 22 stored in the blank disk stocker 27 to the CD-ROM recorder 23 transport tray 31;

2. transporting those compact disks 22 inspected and found to be defectively recorded to the defective disk stocker 29 for defectively recorded compact disks 22;
3. transporting those compact disks 22 inspected and found to be properly recorded from the recorder tray 31 to the printer tray 33;
4. transporting those recorded compact disks 22 found to have label print errors from the printer tray 33 to the defective disk stocker 29; and
5. transporting recorded compact disks 22 for which the printer 26 has properly printed labels 25 from the printer tray 33 to the recorded disk stocker 28 for properly recorded compact disks 22.

Attention is directed to the CD-ROM recorder 23 and printer 26 placement positions. As noted previously, the CD-ROM recorder 23 is positioned at the right side of the interior space enclosed by the dustproof cover. By contrast, the printer 26 is positioned at the left side of the dustproof cover 36. Further, the transporter 30 is positioned between the CD-ROM recorder 23 and the printer 26.

Accordingly, the zone of movement 50 of the arm 30A as it performs steps 1 and 2 described above and represented by the dashed line in FIG. 2, is confined to the right side of the interior of the dustproof housing 36. By contrast, the zone of movement 51 of the arm 30A as it performs step 5 above and as represented by the double-dotted-and-dashed line in FIG. 2, is confined to the left side of the interior of the dustproof housing 36. As can be appreciated from the diagram, the zone of movement 51 includes the zone of movement of the printer tray 33 as it extends from and retracts into the printer 26.

As a result, the disk manufacturing apparatus 20 of the present embodiment completely separates the zone of movement 50 of the arm 30A as the arm 30A performs steps 1 and 2 described above from the zone of movement 51 of the arm 30A as the arm 30A performs step 5 described above. At the same time, the separation of the two zones of movement 50, 51 does not reduce the efficiency of compact disk production because the arm 30A also performs step 3 as described above, in which recorded compact disks 22 are transported between zone of movement 50 and zone of movement 51.

In addition, although the zone of movement required for the arm to perform step 4 as described above coincides with the two zones of movement 50, 51, as described above the occurrence of a printing error is extremely rare, so essentially there is no reduction in the efficiency of compact disk production.

Therefore, according to the disk manufacturing apparatus 20 of the present embodiment the transporter 30 can transport compact disks 22 among the CD-ROM recorder 23, the blank disk stocker 27 and defective disk stocker 29 without regard to whether the printer tray 33 is extracted or retracted.

In short, even in a state in which the printer tray 33 is extended from the printer 26 the operation of the transporter 30 is not impeded thereby, and thus the compact disks 22 can be moved among the CD-ROM recorder 23, the blank disk stocker 27 and the defective disk stocker 29 using the transporter 30. As a result, the waiting time associated with transport of the compact disks by the transporter 30 in the conventional compact disk manufacturing apparatus 1 described above is eliminated to provide a more efficient compact disk production process.

In addition, positioning the CD-ROM recorder 23 on the right side of the interior space enclosed by the dustproof housing 36 and the printer 26 on the left side of the interior space enclosed by the dustproof housing 36 as in the disk manufacturing apparatus 20 according to the present embodiment improves the overall stability of the apparatus 20 as compared to the conventional compact disk manufacturing apparatus 1, such that additional CD-ROM recorders 23 can be provided without fear that the compact disk manufacturing apparatus 20 will tip over.

Those skilled in the art will appreciate that although the foregoing description uses a compact disk, the disk manufacturing apparatus 20 of the present invention is not limited to the manufacture of compact disks but can be adapted to a variety of disk-like recording media, including, for example, digital video disks.

The above description is provided in order to enable any person skilled in the art to make and use the invention and sets forth the best mode contemplated by the inventor of carrying out the invention.

The present invention is not limited to the specifically disclosed embodiment, and variations and modifications may be made without departing from the scope and spirit of the present invention.

The present application is based on Japanese Priority Application No. 11-060272 filed on Mar. 8, 1999, the entire contents of which are hereby incorporated by reference.

What is claimed is:

1. A disk manufacturing apparatus comprising:
   a recorder recording information on a blank disk-like recording medium placed on an extended recording tray provided on the recorder, in a state in which the recording tray is retracted into the recorder;
   a printer printing a label affixed to a recorded disk placed on an extended printer tray provided on the printer, in a state in which the printer tray is retracted into the printer;
   a transporter transporting the disk, said transporter having a rotatable arm for rotating the disk from said recorder to said printer; and
   a common housing for said recorder, printer and transporter with the recorder and printer arranged in said common housing on opposite sides of said transporter such that said rotatable arm forms a first zone of movement of the disk transported to and from the recorder and a second zone of movement of the disk transported to and from the printer with said first zone of movement and said second zone of movement being spatially separated from each other in a horizontal direction.

2. A disk manufacturing apparatus comprising:
   a recorder recording information on a blank disk-like recording medium placed on an extended recording tray provided on the recorder, in a state in which the recording tray is retracted into the recorder;
   a printer printing a label affixed to a prerecorded disk placed on an extended printer tray provided on the printer, in a state in which the printer tray is retracted into the printer;
   a plurality of stockers separately holding blank disks, properly recorded disks and defectively recorded disks, respectively;
   a transporter transporting the disks among the recorder, printer and each of the plurality of stockers, said transporter having a rotatable arm for rotating the disk from said recorder to said printer; and
   a common housing for said recorder, printer, transporter and said plurality of stockers with the recorder and printer arranged in said common housing on opposite sides of said transporter such that said rotatable arm forms a first zone of movement of the disk transported from a stocker to the recorder and recording tray and a second zone of movement of the disk transported from a stocker to the printer and the printer tray with said first zone of movement and said second zone of movement being spatially separated from each other in a horizontal direction.

3. The disk manufacturing apparatus as claimed in claim 2, wherein the stocker for holding defectively recorded disks is positioned directly beneath the recorder tray in a state in which the recorder tray is extended from the recorder.

4. The disk manufacturing apparatus as claimed in claim 2, wherein the stocker for holding the properly recorded disks is positioned directly beneath the printer tray in a state in which the printer tray is extended from the printer.

* * * * *